United States Patent
Tanaka et al.

(10) Patent No.: US 8,254,088 B2
(45) Date of Patent: Aug. 28, 2012

(54) GAS-INSULATED SWITCHGEAR

(75) Inventors: Masahito Tanaka, Chiyoda-ku (JP);
Osamu Kisanuki, Chiyoda-ku (JP)

(73) Assignee: Mitsubishi Electric Corporation,
Chiyoda-Ku, Tokyo (JP)

( * ) Notice: Subject to any disclaimer, the term of this patent is extended or adjusted under 35 U.S.C. 154(b) by 260 days.

(21) Appl. No.: 12/746,802

(22) PCT Filed: Dec. 28, 2007

(86) PCT No.: PCT/JP2007/075319
§ 371 (c)(1),
(2), (4) Date: Jun. 8, 2010

(87) PCT Pub. No.: WO2009/084111
PCT Pub. Date: Jul. 9, 2009

(65) Prior Publication Data
US 2010/0259870 A1    Oct. 14, 2010

(51) Int. Cl.
*H02B 5/00* (2006.01)
(52) U.S. Cl. ........ 361/604; 361/602; 361/611; 361/612; 361/618; 361/619; 361/620
(58) Field of Classification Search .......... None
See application file for complete search history.

(56) References Cited

U.S. PATENT DOCUMENTS

| | | | | |
|---|---|---|---|---|
| 3,823,346 A * | 7/1974 | Olsen | ............ | 361/612 |
| 4,262,323 A * | 4/1981 | Yoshida | ............ | 361/604 |
| 4,862,319 A * | 8/1989 | Suzuyama et al. | ............ | 361/612 |
| 5,006,958 A * | 4/1991 | Sasamori et al. | ............ | 361/618 |
| 6,624,372 B1 | 9/2003 | Ogawa et al. | | |
| 7,236,351 B2 * | 6/2007 | Chavot et al. | ............ | 361/604 |
| 7,414,827 B2 * | 8/2008 | Kashiwa et al. | ............ | 361/612 |
| 2004/0037025 A1 * | 2/2004 | Abe | ............ | 361/605 |
| 2005/0141175 A1 * | 6/2005 | Chavot et al. | ............ | 361/604 |
| 2009/0154069 A1 * | 6/2009 | Otsuka et al. | ............ | 361/612 |

FOREIGN PATENT DOCUMENTS

| | | |
|---|---|---|
| JP | 56-101118 U | 8/1981 |
| JP | 58-099208 A | 6/1983 |
| JP | 59-010111 A | 1/1984 |
| JP | 60-156817 U | 10/1985 |
| JP | 9-284929 A | 10/1997 |
| JP | 10-229614 A | 8/1998 |
| JP | 2000-022708 A | 1/2000 |
| JP | 2001-016720 A | 1/2001 |
| JP | 2001-268734 A | 9/2001 |
| WO | WO 00/22708 | 4/2000 |

OTHER PUBLICATIONS

Office Action (Notice of Rejection) from Japanese Patent Office issued in corresponding Japanese Patent Application No. 2009-547854 dated Sep. 13, 2011, with an English translation thereof.
International Search Report (PCT/ISA/210) for PCT/JP2007/075319 dated Apr. 8, 2008.
Written Opinion (PCT/ISA/237) for PCT/JP2007/075319 dated Apr. 8, 2008.

* cited by examiner

*Primary Examiner* — Gregory Thompson
(74) *Attorney, Agent, or Firm* — Buchanan Ingersoll & Rooney PC

(57) ABSTRACT

It is an object to provide gas-insulated switchgear that occupies less installation space, in which the number of bellows to be used can be reduced, and that can minimize a work range in disassembling at addition or accident, and in reassembling. In double-bus gas-insulated switchgear in which a bus-side device is arranged above a breaker to reduce installation space to be occupied, a bellows is arranged between bus-side devices arranged vertically to each other, and under a support frame of the breaker, another support frame that can be separated therefrom is arranged, thereby enabling disassembling of a lower bus-side device alone.

8 Claims, 7 Drawing Sheets

ID_SWITCHGEAR

TECHNICAL FIELD

The present invention relates to double-bus gas-insulated switchgear in which two bus-side devices are arranged above a horizontal breaker.

BACKGROUND ART

Gas-insulated switchgear, in which components such as a breaker and a disconnector are housed in a grounded airtight container and insulating gas is filled, is widely used as switchgear in power plants and substations because of excellent safety and maintainability, and suitability for downsizing of a system.

Generally, when a power receiving substation and the like are constructed using gas-insulated switchgear, assembly work of each circuit that includes a main bus is performed at a factory. Then, connection of buses between circuits is performed at a site, thereby reducing man-hours required for installation at the site. Because the assembly work of the gas-insulated switchgear is performed separately for each circuit, each circuit includes a part tolerance and a dimensional deviation caused in assembly. Therefore, by arranging a bellows at a joint at which two buses are connected, to absorb the deviation, connection of buses is simplified. In addition, considering disassembling for minimization of power-cut range, which may be required in future at the time of expansion or at the time of accident, and re-assemblability, bellows are arranged at appropriate positions. However, because bellows are expensive, it is desired that the number of bellows be reduced to cut costs.

In the technique disclosed in Patent Document 1, the number of bellows is reduced in double-bus gas-insulated switchgear having a vertical breaker. Bellows are conventionally arranged at both ends of two unit bus pipes to connect respective circuits. In Patent Document 1, bellows are arranged only at one ends of the unit bus pipes. The bellows are arranged between two gas-insulated switch gear that are adjacent such that the bellows are alternately provided on the unit bus pipes.

In the technique disclosed in Patent Document 2, in double-bus gas-insulated switchgear in which a breaker is arranged horizontally and buses are arranged thereabove in a T-shape, a frame is further arranged under a frame that supports the horizontal breaker, thereby achieving a structure that enables easy disassembling of a breaker alone.

Patent Document 1: Unexamined Utility Model Application Publication No. S56-101118

Patent Document 2: International Publication No. 2000/022708 Pamphlet

DISCLOSURE OF INVENTION

Problem to be Solved by the Invention

However, the above conventional techniques had problems as described bellow.

According to the conventional technique described in Patent Document 1, while the number of bellows between buses connecting circuits is reduced, the disassembling range at the time of expansion or accident and re-assemblability are not considered. When gas-insulated switchgear is structured, it is generally demanded that gas-insulated switchgear be designed with consideration for minimization of the disassembling range and the power-cut range in case of future expansion and accidents. This is also very important for reducing man-hours at the site. Moreover, minimization of the disassembling range at the site enables to avoid entrance of foreign matters into the inside of the gas-insulated switchgear and contributes to improvement in reliability. However, referring to FIG. 1 of Patent Document 1, when the disconnector and the main bus on a breaker side are disassembled, an adjacent breaker is also required to be disassembled, and this causes a problem in that extensive disassembling work is required. Furthermore, there is a part that, when re-assembled, requires connecting different-angled tank flange surfaces thereof at the same time. Therefore, it is difficult to absorb the assembling deviation occurring at the reassembling, and thus workability is very poor. Accordingly, it is demanded that connection of surfaces of tank flanges be performed one by one, and a configuration is adopted that can be easily reassembled.

In addition, because a bus-side device is horizontally arranged beside a vertical breaker in the gas-insulated switchgear described in Patent Document 1, the unit length is large, and there is a problem in that the space to be occupied increases.

The gas-insulated switchgear described in Patent Document 2 has a structure in which buses are arranged in a T-shape above a horizontal breaker to reduce the height of the entire device. One of the buses, under which an operating device of the breaker is disposed, is positioned at an opposite side to a line-side device and the T-shaped branch point is interposed therebetween. The one of the buses and the operating device cause the unit length and the space to be occupied to increase.

The present invention is achieved in view of the above problems, and it is an object of the present a invention to provide gas-insulated switchgear that occupies less installation space with the reduced number of bellows, and that can minimize a work range in disassembling at the time of expansion or accident, and in reassembling.

Gas-insulated switchgear according to an aspect of the present invention is a gas-insulated switchgear of double bus type that is structured by connecting a plurality of breaker units having breakers via double buses, wherein the breaker unit includes a breaker that is arranged such that a longitudinal direction is horizontal, that has two outlets branching perpendicularly in same direction keeping a predetermined interval in the longitudinal direction, and that has an operation device therefor arranged on an opposite side to the outlets; a lower disconnector that is connected to one of the outlets of the breaker and is arranged above the breaker; a line-side device that is connected to the other of the outlets and is arranged above the breaker; a lower bus that is connected to the lower disconnector and is arranged between the two outlets; an upper disconnector that is arranged above the lower disconnector; an upper bus that is connected to the upper disconnector and is arranged above the lower bus in a layered manner; a first bellows that is arranged so as to connect the lower disconnector and the upper disconnector vertically; a first support frame that supports the breaker from below; a second support frame that is arranged under the first support frame and that is separatable from the first support frame; a second bellows that is arranged only at one end of the upper bus at a bus connection with an adjacent unit; and a third bellows that is arranged only at one end of the lower bus at a bus connection with an adjacent unit.

Effect of the Invention

According to the present invention, with such an arrangement that a bellows is arranged only at one end of a bus connecting between units, the number of bellows to be used can be reduced compared to the case where bellows are arranged at both ends, and connection of units is enabled absorbing variations of a part tolerance, a dimensional deviation caused in assembly, and the like. Moreover, when the upper disconnector and the upper bus are to be disassembled, dieassembling is performed only by compressing and separating the bellows between the disconnectors. Furthermore, when the lower disconnector and the lower bus are disassembled, dieassembling is performed by removing the second support frame arranged under the first support frame, and by compressing the bellows between the disconnectors. Thus, disassembling and reassembling of the lower disconnector and the lower bus are possible, and the disassembling range can be minimized. Moreover, by arranging the operating device of the breaker under the breaker arranged horizontally, and arranging the bus-side device and the line-side device above the breaker, the unit length is shortened to reduce installation space.

BRIEF DESCRIPTION OF DRAWINGS

FIG. 5-1 is an enlarged view of a lower disconnector and a lower bus.

FIG. 5-2 is a view showing a state where a bellows arranged at an upper portion of the lower disconnector is compressed and disassembled.

FIG. 5-3 is a view showing a state where a partition frame under a support frame is removed and a breaker is brought down.

FIG. 5-4 is a top view taken along line G-G in FIG. 5-1 showing a state where a bellows at one side of the lower bus is compressed.

FIG. 5-5 is a view taken along line G-G in FIG. 5-1 showing a state where the lower bus and the lower disconnector are disassembled in a integrated manner.

EXPLANATIONS OF LETTERS OR NUMERALS

Figure 1:
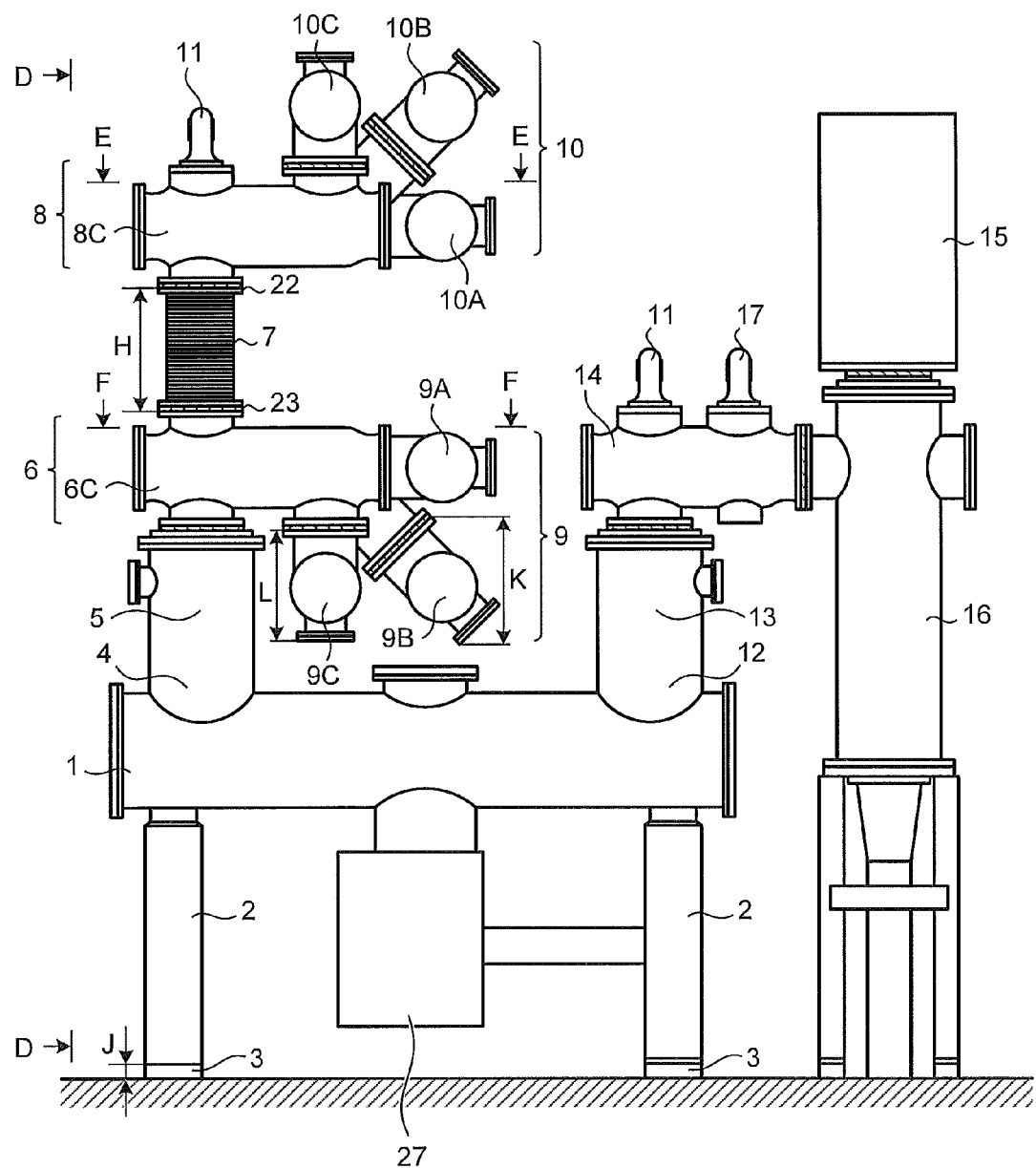
FIG. 1 is a front view showing a configuration of gas-insulated switchgear according to a first embodiment.

1 Breaker
2, 3 Support frame
4, 12 Outlet
5, 13 Instrument current transformer
6A, 6B, 6C Lower disconnector
7 Bellows
8, 8A, 8B, 8C Upper disconnector
9A, 9B, 9C Lower bus
10A, 10B, 10C Upper bus
11 Earthing switch
14 Disconnector
15 Instrument potential transformer
16 Cable head
17 Line-side earth switch
19 Bellows
20 Bellows-bus connection
21 Bus connection
22 Upper disconnector-bellows connection
23 Lower disconnector-bellows connection
24 Lower disconnector-breaker connection
25, 26 Connection tank
27 Operating device

BEST MODE(S) FOR CARRYING OUT THE INVENTION

Embodiments of gas-insulated switchgear according to the present invention are explained in detail below with reference to the drawings. The present invention is not limited by the embodiments.

First Embodiment

Figure 2:
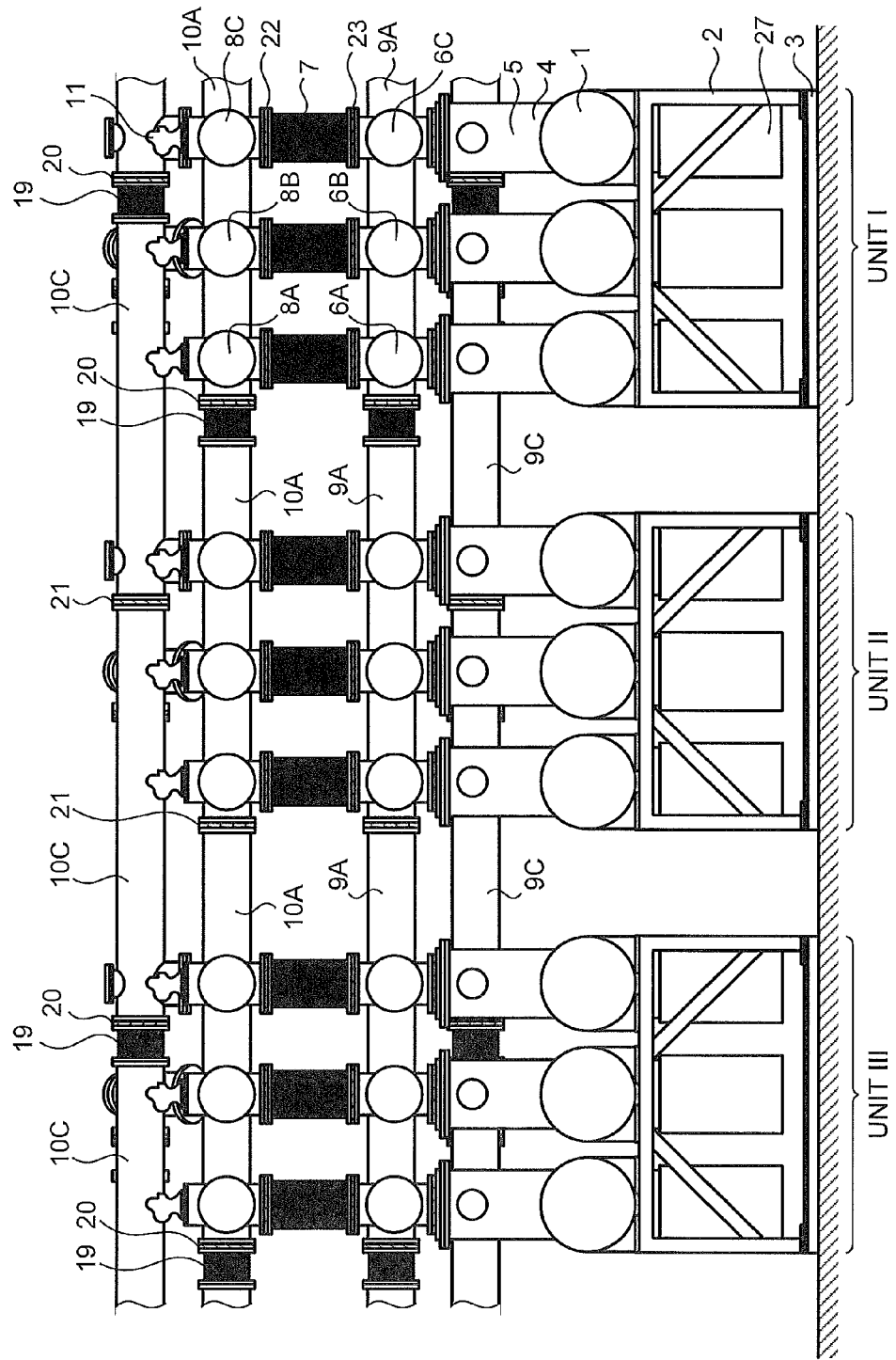
FIG. 2 is a side view taken along line D-D in FIG. 1 and shows a state where three circuits of the gas-insulated switchgear are connected.
Figure 3:
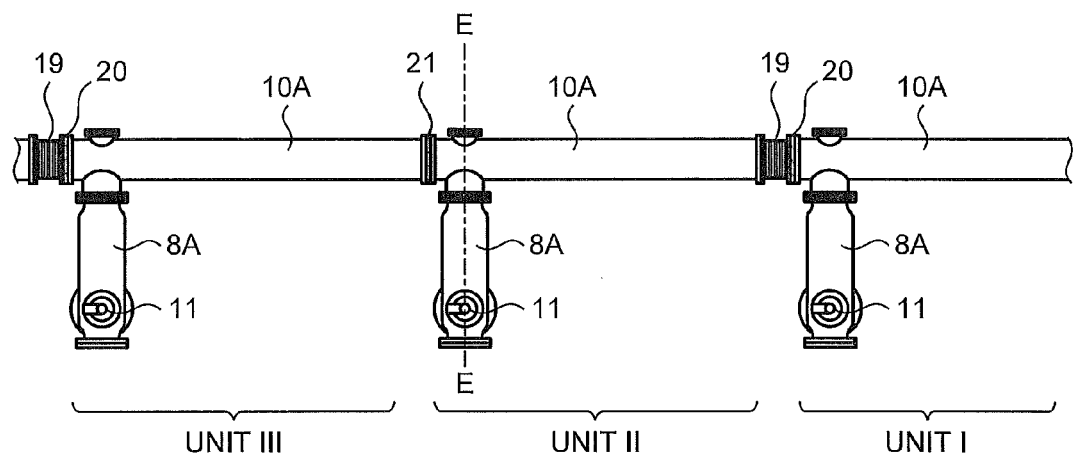
FIG. 3 is a top view of an upper-side phase A including an upper disconnector taken along line E-E in FIG. 1.
Figure 4:
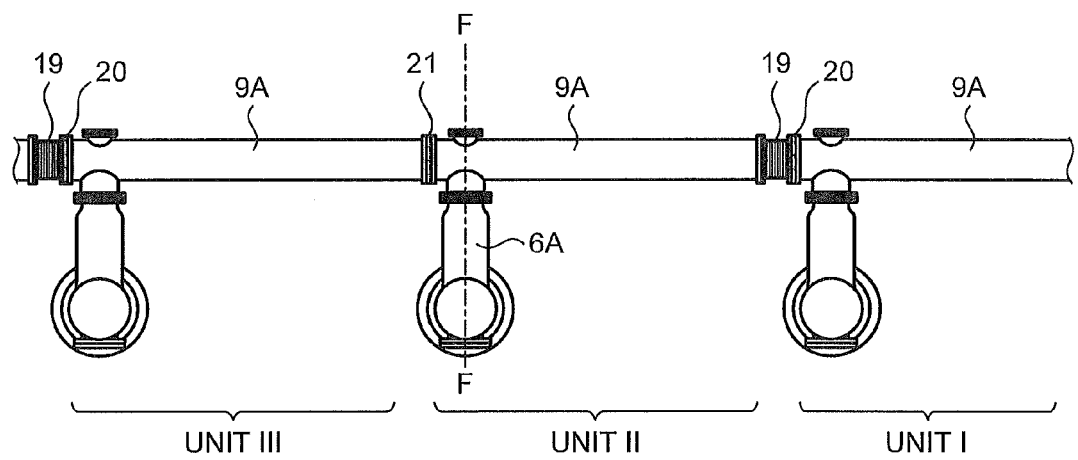
FIG. 4 is a top view of a lower-side phase A including a lower disconnector taken along line F-F in FIG. 1.

FIG. 1 is a front view showing a configuration of isolated-phase gas-insulated switchgear according to the present embodiment, FIG. 2 is a side view taken along line D-D in FIG. 1 showing a state where three circuits of the gas-insulated switchgear are connected, FIG. 3 is a top view of an upper A phase including an upper disconnector taken along line E-E in FIG. 1, and FIG. 4 is a top view of a lower A phase including a lower disconnector taken along line F-F in FIG. 1.

As shown in FIG. 1 and FIG. 2, a breaker 1 having a breaking unit in a cylindrical tank is a horizontal breaker that is supported and fixed on a support frame 2 such that the longitudinal direction of the tank is horizontal. An operating device 27 to operate the breaker is arranged at a lower portion thereof. Moreover, under the support frame 2, a support frame 3 that can be separated from this support frame 2 is provided. In the present embodiment, an example in which three circuits of the gas-insulated switchgear are connected is described, and the three circuits are indicated as units (I) to (III) in FIG. 2. Each unit has three breakers 1, and these correspond to three phases. In the following explanation, the three phases are expressed as A, B, and C to distinguish each phase.

At an upper portion of one end of the breaker 1, an outlet 4 is arranged, and in the outlet 4, an instrument current transformer 5 is provided. To the three breakers 1 corresponding to three phases, lower disconnectors 6A, 6B, and 6C, which are lower disconnectors, are connected to the upper portion of the outlets 4, respectively. In FIG. 1, the lower disconnector 6C connected to the upper portion of the outlet 4 is illustrated. The lower disconnectors 6A, 6B, and 6C are arranged such that the longitudinal direction thereof is parallel to the longitudinal direction of the breaker 1, and are connected to the outlets 4 at lower portions at one ends, respectively.

To the other ends of the lower disconnectors 6A, 6B, and 6C, lower buses 9A, 9B, and 9C that are arranged at a lower side are connected, respectively. As described above, the lower buses 9A, 9B, and 9C form an isolated-phase bus in which three phases are separated, and A, B, and C to distinguish the buses indicate phase A, phase B, and phase C, respectively. The extending directions of the lower buses 9A, 9B, and 9C are parallel to each other, and are perpendicular to the longitudinal direction of the breaker 1. The lower bus 9A is arranged on the same horizontal plane as the lower disconnectors 6A, 6B, and 6C, the lower bus 9B is arranged on the same horizontal plane as the lower bus 9C, and the lower bus 9C is arranged below the lower disconnectors 6A, 6B, and 6C. The lower buses 9A, 9B, and 9C are arranged such that the center of the cross-section of each of the lower buses 9A, 9B, and 9C is to be a vertex of an isosceles triangle, and the center of the cross-section of the lower bus 9B is to be the vertex of a right angle.

At upper portions of the lower disconnectors 6A, 6B, and 6C, bellows 7 are arranged, respectively. For example, to the upper portion of the lower disconnector 6C, one end of an upper disconnector 8C, which is a disconnector arranged at an upper side, is connected via this bellows 7. Similarly, to the upper portion of the lower disconnector 6A, one end of an upper disconnector 8A is connected via the bellows 7, and to the upper portion of the lower disconnector 6B, one end of an upper disconnector 8B is connected through the bellows 7. As described, the bellows 7 connect between disconnectors. The upper disconnectors 8A, 8B, and 8C are arranged parallel to the lower disconnectors 6A, 6B, and 6C. To the other ends of the upper disconnectors 8A, 8B, and 8C, upper buses 10A, 10B, and 10C, which are buses arranged at an upper side, are connected, respectively. The upper buses 10A, 10B, and 10C form an isolated-phase bus in which three phases are separated. The upper buses 10A, 10B, and 10C extend parallel to the lower buses 9A, 9B, and 9C. The upper bus 10A is arranged on the same horizontal plane as the upper disconnectors 8A, 8B, and 8C, the upper bus 10B is arranged on the same horizontal plane as the upper bus 10C, and the upper bus 10C is arranged above the upper disconnectors 8A, 8B, and 8C. The upper buses 10A, 10B, and 10C are arranged such that the center of the cross-section of each of the upper buses 10A, 10B, and 10C is to be a vertex of an isosceles triangle, and the center of the cross-section of the upper bus 10B is to be the vertex of a right angle. Furthermore, at upper portions of the upper disconnectors 8A, 8B, and 8C, earthing switches 11 are arranged.

As shown in FIG. 1, at an upper portion of the other end of the breaker 1, an outlet 12 is arranged, and in the outlet 12, an instrument current transformer 13 is provided. As described, the outlet 4 and the outlet 12 are arranged on both sides of the breaker 1, and are arranged perpendicularly to the longitudinal direction of the breaker 1, and extend in the same directions. Further, these outlets are arranged in an upper side. As described, in the breaker 1, the operating device 27 is arranged on the opposite side (that is, a lower portion) to the side on which the outlets 4 and 12 are arranged. Moreover, the lower buses 9A, 9B, and 9C are arranged between the outlet 4 and the outlet 12, and the upper buses 10A and 10B are arranged in layers above the lower buses 9A and 9B, and the upper bus 10C is layered above the lower bus 9C. In the present embodiment, the outlets 4 and 12 of the breaker 1 are arranged, for example, at positions substantially equally away from the central portion of the breaker 1 in the longitudinal direction. Above the outlet 12, a line-side device including a disconnector 14, an instrument potential transformer 15, a cable head 16, and the like is provided. Specifically, to the upper portion of the outlet 12, the disconnector 14 is connected, and to the disconnector 14, the cable head 16 is connected. The cable head 16 is arranged such that the longitudinal direction thereof is perpendicular to the plane on which the gas-insulated switchgear is installed, and the instrument potential transformer 15 is provided thereabove. A cable connected to the cable head 16 is present thereunder, and is connected to a not shown transformer or other substations. Furthermore, above the disconnector 14, the earthing switch 11 and a line-side earth switch 17 are arranged.

In FIG. 2, three breaker units each of which is configured as described above including the breaker 1 are arranged (that is, units I to III), and the units are connected to each other through buses. For example, as shown in FIG. 3, the upper buses 10A each of which is connected to the disconnector 8A of unit I or the disconnector 8A of unit II are connected to each other at a bus connection 20 through bellows 19. The upper buses 10A each of which is connected to the disconnector 8A of unit II or the disconnector 8A of unit III are connected to each other at a bus connection 21. The upper bus 10A connected to the disconnector 8A of unit I specifically is a bus housed inside a bus pipe that is connected to the disconnector 8A, and is connected through the bus connection 20 arranged at one end of this bus pipe. Therefore, by connecting the corresponding bus pipes of the upper buses 10A in adjacent units I and II with each other at the bus connection 20, and by connecting the corresponding bus pipes of the upper buses 10A in adjacent units II and III at the bus connection 21, the upper buses 10A are linearly connected. At this time, with a configuration in which the bellows 19 for bus connection is arranged only at the end on one side of the bus connection 20 of the upper bus 10A connecting between units, the number of the bellows 19 to be used therein is reduced. In FIG. 4, a similar bus connection form is shown with the lower buses 9A connected to the lower disconnectors 6A. The above bus connection form is similarly applied also to the other upper buses 10B and 10C, and the lower buses 9B and 9C.

At the time of installation at a site, the bus connections 20 and 21 of the lower buses 9A, 9B, and 9C and the upper buses 10A, 10B, and 10C are engaged at the site to connect between the units I, II, and III, which are circuits of the gas-insulated switchgear as shown in FIG. 2, and are separately assembled at a factory. At this time, to absorb variations of a part tolerance and a dimensional deviation caused in assembly at each phase, the bellows 19 are arranged at one end of the bus pipe of each of the lower buses 9A, 9B, and 9C and the upper buses 10A, 10B, and 10C. This enables connection of units I, II, and III at the site.

Disassembling of the upper disconnector 8 (generic name of the upper disconnectors 8A, 8B, and 8C) and the upper bus 10 (generic name of the upper buses 10A, 10B, and 10C) is explained below. First, an upper disconnector-bellows connection 22 is separated, and the bellows 7 between the disconnectors is compressed downward in the direction of axis thereof. Subsequently, the bus connection 20 that is one connection of the upper bus 10 is separated and the bellows 19 between the buses is compressed in the direction of axis thereof, and further, the bus connection 21 on the other side is separated. Thus, the upper disconnector 8 and the upper bus 10 can be easily disassembled. At the reassembling, the above disassembling steps are performed in the reverse order.

Figures 1, 5:
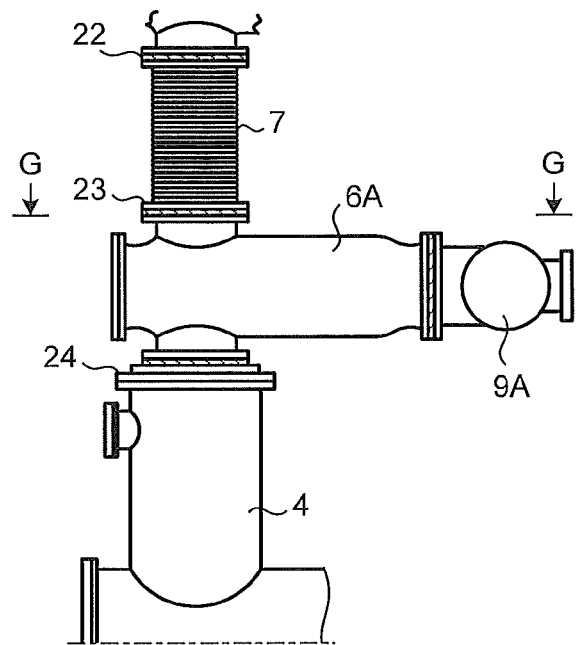
Figures 2, 5:
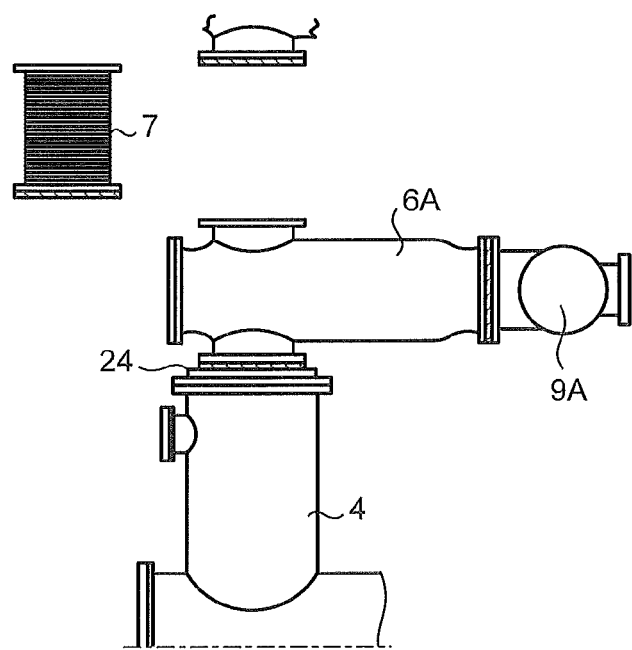
Figures 3, 5:
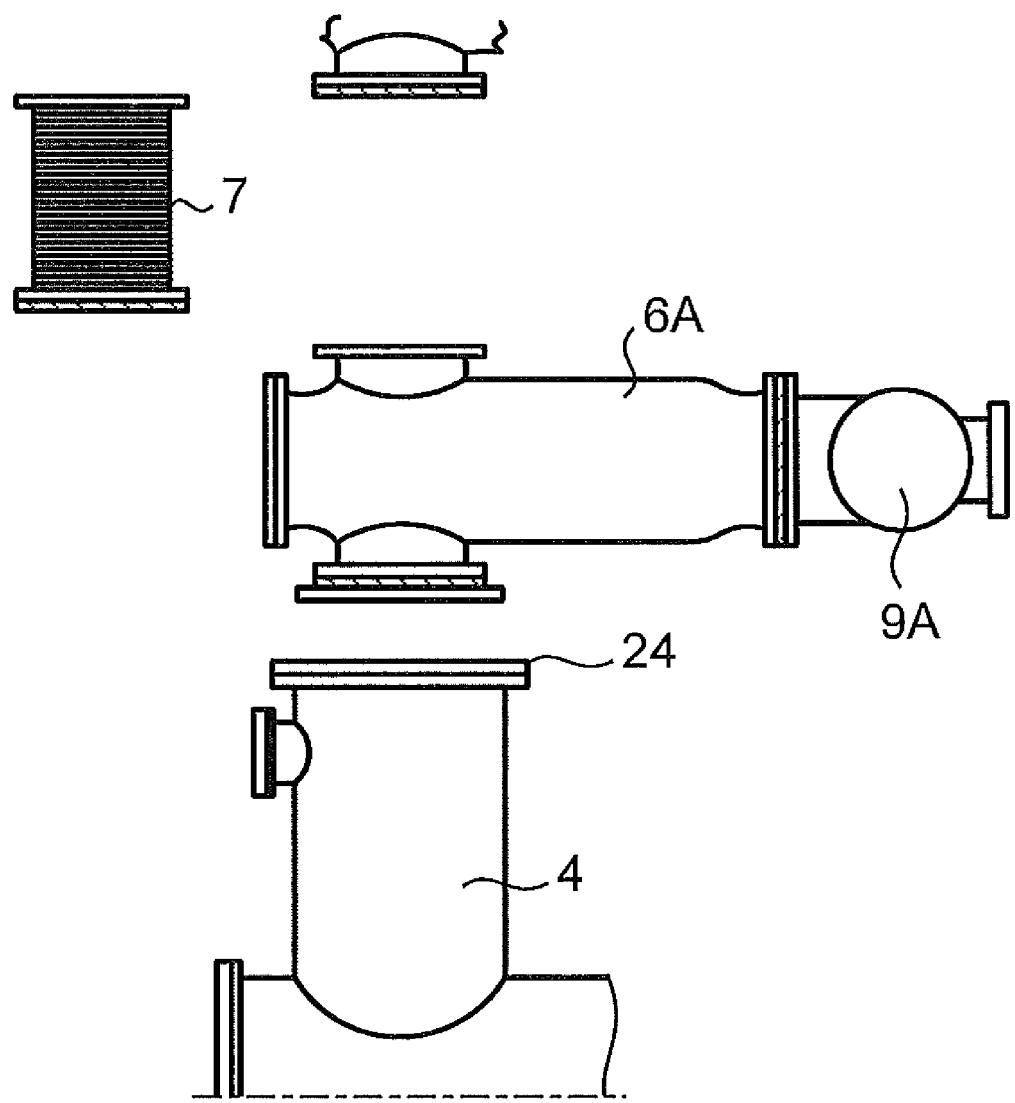
Figures 4, 5:
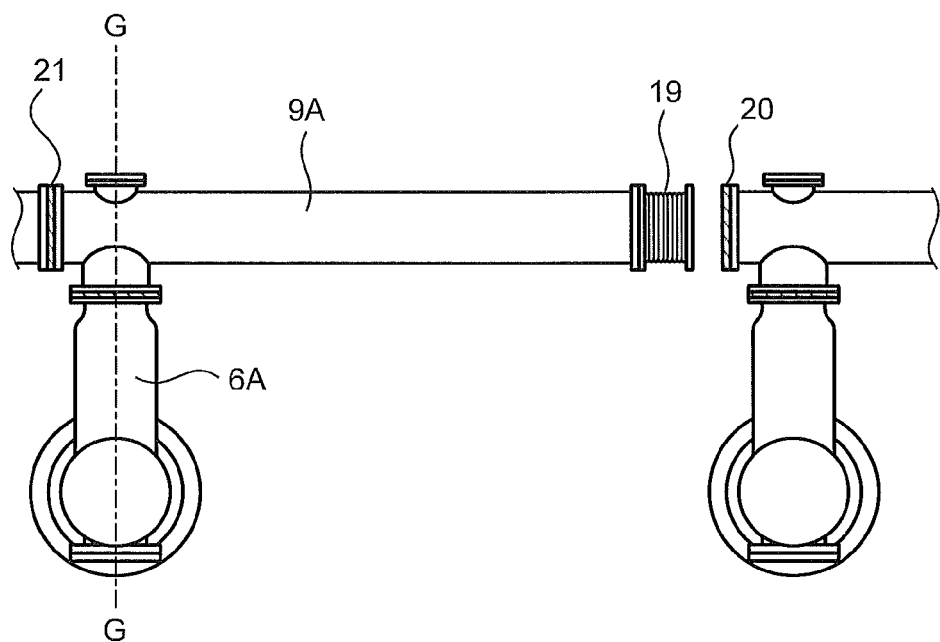
Figure 5:
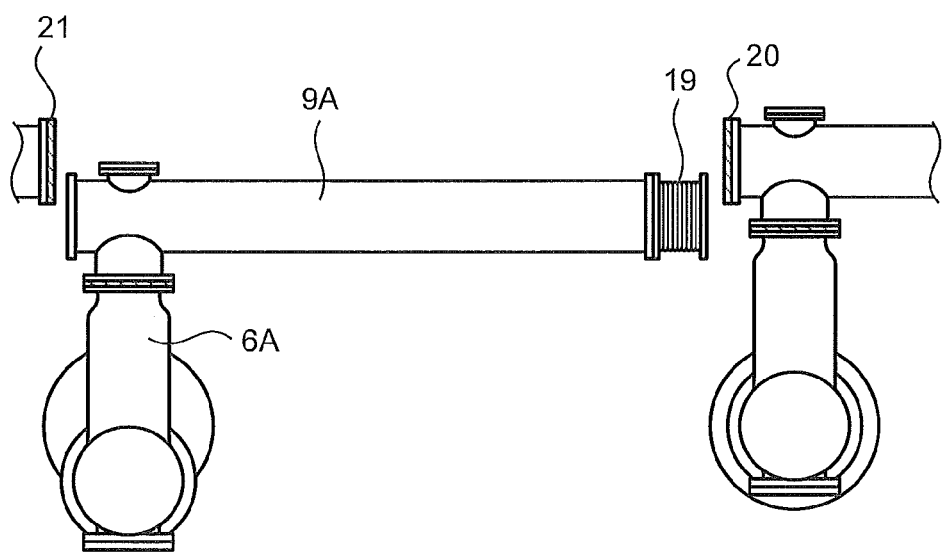

Next, the disassembling procedure of the lower disconnector 6 (generic name of the lower disconnectors 6A, 6B, and 6C) and the lower bus 9 (generic name of the lower buses 9A, 9B, and 9C) is explained below. FIG. 5-1 is an enlarged view of the lower disconnector 6A and the lower bus 9A, FIG. 5-2 is a view showing a state where the bellows 7 arranged above the lower disconnector 6A is compressed and disassembled, FIG. 5-3 is a view showing a state where the support frame 3 under the support frame 2 is removed and the breaker 1 is brought down in the lower disconnector 6A, FIG. 5-4 is a top view including the lower disconnector 6A taken along line G-G in FIG. 5-1 showing a state where the bellows at one side of the lower bus is compressed, and FIG. 5-5 is a top view including the lower disconnector 6A taken along line G-G in FIG. 5-1 showing a state where the lower bus 9A and the lower disconnector 6A are disassembled in a integrated manner.

As shown in FIG. 5-1 and FIG. 4, four points of a lower disconnector-bellows connection 23, a lower disconnector-breaker connection 24, the bus connection 20 between the bellows and the bus, and the bus connection 21 are engaged with bolts (not shown). First, in FIG. 5-2, the lower disconnector-bellows connection 23 is separated and the bellows 7 between the disconnectors is compressed upward in the direction of axis thereof, and further, the upper disconnector-bellows connection 22 is separated and the bellows 7 between the disconnectors is disassembled. In FIG. 5-3, the lower disconnector-breaker connection 24 is separated, the support frame 2 shown in FIG. 1 is lifted up with a jack to remove the support frame 3, and the breaker 1 and the support frame 2 are brought down by the height of the support frame 3. Subsequently, in FIG. 5-4, the bellows-bus connection 20 is separated and the bellows 19 between the buses is compressed in the direction of axis thereof. Furthermore, in FIG. 5-5, the bus connection 21 is separated. Thus, the lower disconnector 6A and the lower bus 9A can be disassembled.

As for phase B and phase C, the lower buses 9B and 9C are arranged below the lower disconnectors 6B and 6C. When the sum of the dimension (dimension H) of the height of the bellows 7 between the disconnectors and the dimension (dimension J) of the height of the support frame 3 is made larger than the dimension (dimensions K, L) of the height of the lower buses 9B and 9C in a perpendicular direction (H+J>K, L), and the bellows 7 is disassembled at first, disassembling can be performed similarly to phase A (see FIG. 1). At the reassembling, the above disassembling steps are performed in the reverse order. In addition, the dimension of the height of the bellows 7 is the dimension of the height when the bellows 7 is not compressed.

According to the present embodiment, while reducing the number of bellows to be used by arranging the bellows 19 only at one end of buses (the upper buses 10A, 10B, 10C, the lower buses 9A, 9B, and 9C) connecting between the units, compared to the case where bellows are arranged at both ends (for each phase bus, use of bellows reduced one each in upper and lower buses, which is two in total), units can be connected absorbing variations of a part tolerance, a dimensional deviation caused in assembly, and the like. Furthermore, when the upper disconnector 8 and the upper bus 10 are disassembled, disassembling is performed by just compressing and separating the bellows 7 between the disconnectors. Moreover, when the lower disconnector 6 and the lower bus 9 are disassembled, it is performed by removing the support frame 3 arranged under the support frame 2, and compressing the bellows 7 between the disconnectors, disassembling and reassembling of the lower disconnector 6 and the lower bus 9 are possible. Thus, the disassembling range can be minimized. Further, by arranging the bus-side device and the line-side device above the horizontal breaker 1, and the operating device 27 of the breaker below the breaker 1, the unit length is shortened to reduce the installation space to be occupied.

Second Embodiment

Figure 6:
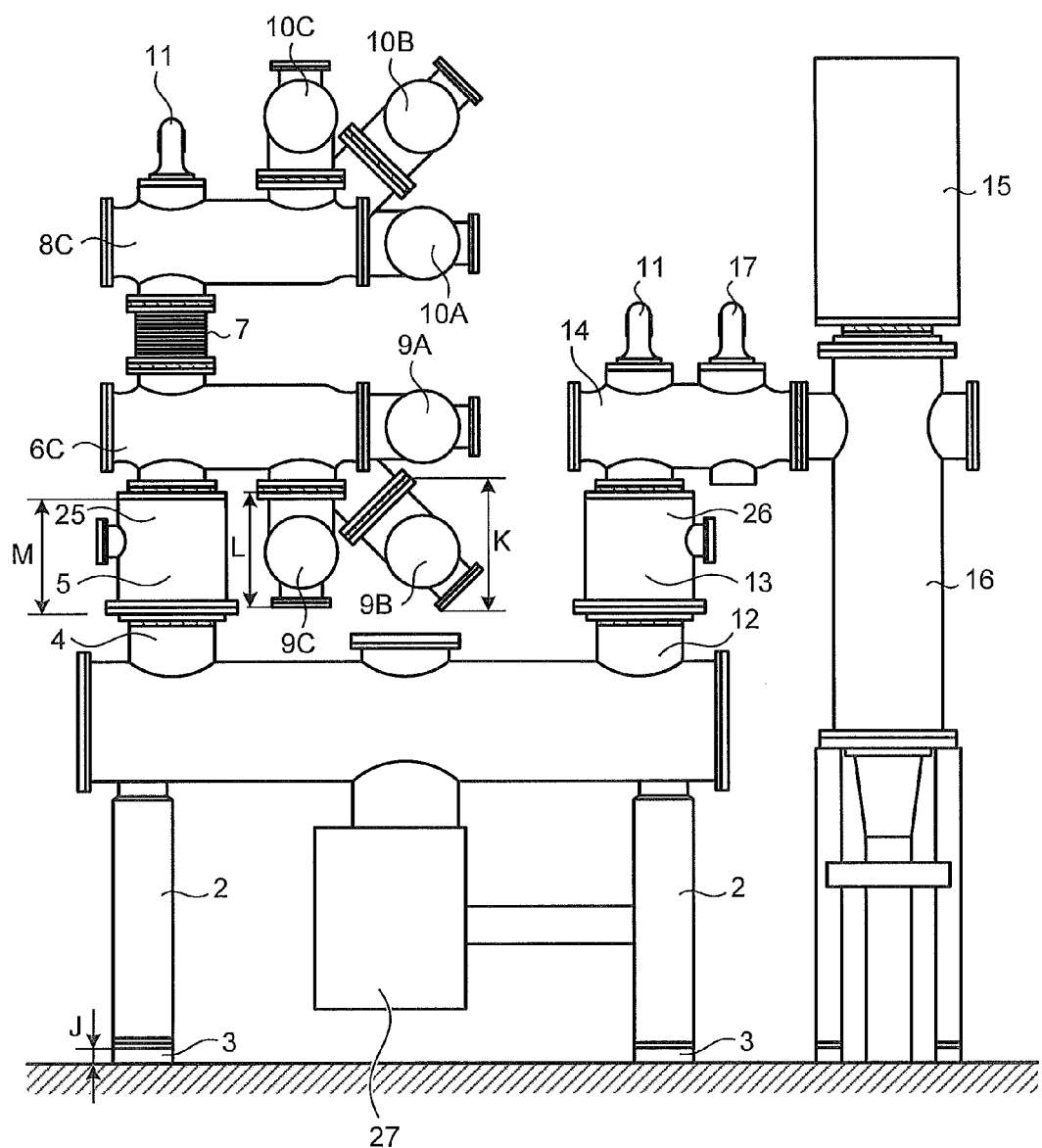
FIG. 6 is a front view showing a configuration of gas-insulated switchgear according to a second embodiment.

FIG. 6 is a front view showing a configuration of gas-insulated switchgear according to a second embodiment. In the first embodiment, the instrument current transformers 5 and 13 are arranged at the outlets 4 and 12 on respective sides of the breaker 1. In this second embodiment, the height of the outlets 4 and 12 are arranged to be lower, a connection tank 25 in which the instrument current transformer 5 is housed is arranged between the outlet 4 and the lower disconnectors 6A, 6B, and 6C, and a connection tank 26 in which the instrument current transformer 13 is housed is arranged between the outlet 12 and the disconnector 14. Thus, gas isolations of the breaker 1 and the instrument current transformers 5 and 13 are sectionalized. The arrangement and configuration of other devices are the same as the first embodiment.

In the present embodiment, the breaker 1 alone can be disassembled by, disassembling the connection between the breaker 1 and the connection tanks 25 and 26, lifting up the support frame 2 by a jack, and removing the support frame 3 to lower the breaker 1 and the support frame 2. AT this time, the dimension of the height of the support frame 3 is to be enough to pull out the breaker 1, for example, in the order of several hundreds of millimeters.

Moreover, in the present embodiment, when the lower disconnector 6 and the lower bus 9 are disassembled, the sum of the dimension (dimension M) of the height of the connection tank 25 and the dimension (dimension J) of the height of the support frame 3 is made to be larger than the dimension (dimensions K, L) of the lower buses 9B and 9C in a perpendicular direction (M+J>K, L), and the connection tank 25 is disassembled at first together with removal of the support frame 3. With this, the lower buses 9B and 9C can be disassembled. In this case, the dimension of the height of the bellows 7 between the disconnectors is not required to be taken into consideration as in the first embodiment. Thus, the position of the upper disconnector 8 and the upper bus 10 can be lowered, and compact gas-insulated switchgear that has excellent resistance to earthquakes can be provided.

In the first and the second embodiments, the upper bus-side devices and the breaker are present in a perpendicular direction. It is desirable that, when the lower bus-side devices are disassembled, the lower disconnectors 6A, 6B, and 6C and the lower buses 9A, 9B, and 9C be pulled out in an integrated manner and with the three phases collectively. Because phases A, B, and C are arranged in independent tanks in isolated-phase gas-insulated switchgear, it is required to lift up all the tanks together with a crane or the like to perform disassembling with three phases collectively, and the workability is poor. Therefore, by arranging a frame (not shown) to support buses not independently but in an integrated manner to fix three phases collectively and by lifting this support frame, workability at reassembling can be improved. In addition, by using this three-phase integrated frame as a transportation frame also, transportation of buses with three phases collectively is enabled. This results in effects of reducing costs on transportation, reducing man-hours at the site, and the like.

Although in the present embodiment, isolated-phase gas-insulated switchgear has been explained as an example, the present invention is not limited thereto, and is applicable to three-phase gas-insulated switchgear, and similar effects as those of the present embodiment can be produced.

INDUSTRIAL APPLICABILITY

The gas-insulated switchgear according to the present invention is effective to reduce the number of bellows to be used and to minimize a disassembling range in a system at the time of expansion, accident, or the like in a configuration in which two bus-side devices are sequentially arranged perpendicularly above a horizontal breaker to reduce installation space to be occupied.

The invention claimed is:
1. Gas-insulated switchgear of double bus type that is structured by connecting a plurality of breaker units having breakers via double buses, wherein
each breaker unit includes
a breaker that is arranged such that a longitudinal direction is horizontal, that has two outlets branching perpendicularly in same direction keeping a predetermined interval in the longitudinal direction, and that has an operation device therefor arranged on an opposite side to the outlets;

a lower disconnector that is connected to one of the outlets of the breaker and is arranged above the breaker;

a line-side device that is connected to the other of the outlets and is arranged above the breaker;

a lower bus that is connected to the lower disconnector and is arranged between the two outlets;

an upper disconnector that is arranged above the lower disconnector;

an upper bus that is connected to the upper disconnector and is arranged above the lower bus in a layered manner;

a first bellows that is arranged so as to connect the lower disconnector and the upper disconnector vertically;

a first support frame that supports the breaker from below;

a second support frame that is arranged under the first support frame and that is separatable from the first support frame;

a second bellows that is arranged only at one end of the upper bus at a bus connection with an adjacent unit of the plurality of breaker units; and a third bellows that is arranged only at one end of the lower bus at a bus connection with an adjacent unit.

2. The gas-insulated switchgear according to claim 1, wherein sum of a dimension of the first bellows in a perpendicular direction and a dimension of the second support frame in a perpendicular direction is larger than a dimension of the lower bus in a perpendicular direction.

3. The gas-insulated switchgear according to claim 1, wherein a detachable connection tank is further included between one of the outlets of the breaker and the lower disconnector.

4. The gas-insulated switchgear according to claim 3, wherein sum of a dimension of the connection tank in a perpendicular direction and a dimension of the second support frame in a perpendicular direction is larger than a dimension of the lower bus in a perpendicular direction.

5. The gas-insulated switchgear according to claim 1, wherein each of the upper bus and the lower bus are configured in an isolated phase form, and a support frame for the upper bus and the lower bus integrally fixes the buses three phases collectively.

6. The gas-insulated switchgear according to claim 2, wherein each of the upper bus and the lower bus are configured in an isolated phase form, and a support frame for the upper bus and the lower bus integrally fixes the buses three phases collectively.

7. The gas-insulated switchgear according to claim 3, wherein each of the upper bus and the lower bus are configured in an isolated phase form, and a support frame for the upper bus and the lower bus integrally fixes the buses three phases collectively.

8. The gas-insulated switchgear according to claim 4, wherein each of the upper bus and the lower bus are configured in an isolated phase form, and a support frame for the upper bus and the lower bus integrally fixes the buses three phases collectively.

* * * * *